H. F. PREFONTAINE
SHUTTER OPERATING ATTACHMENT FOR CAMERAS.
APPLICATION FILED NOV. 16, 1917.

Patented Apr. 9, 1918.

Inventor:
Harry F. Prefontaine

UNITED STATES PATENT OFFICE.

HARRY FREDERICK PREFONTAINE, OF BROOKLYN, NEW YORK.

SHUTTER-OPERATING ATTACHMENT FOR CAMERAS.

1,262,388.           Specification of Letters Patent.         Patented Apr. 9, 1918.

Application filed November 16, 1917. Serial No. 202,336.

*To all whom it may concern:*

Be it known that I, HARRY F. PREFONTAINE, a citizen of the United States of America, residing at Brooklyn, in the county of Kings and State of New York, have invented certain new and useful Improvements in Shutter-Operating Attachments for Cameras, of which the following is a specification.

My invention relates to attachments for cameras and has for its object to provide means whereby the operator can actuate the shutter mechanism from a distance for the purpose of taking his own picture.

It frequently happens that the members of a party including the person selected to operate the camera desire to have their pictures taken in a group and it is the object of the present invention to provide means whereby this desideratum may be attained.

In the accompanying drawings forming part of this specification:

Figure 1:
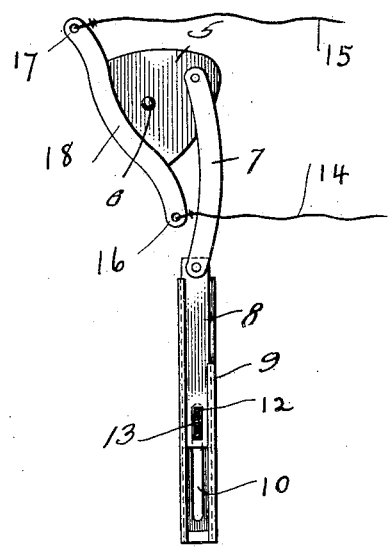
Figure 1 is a front view of my invention showing the position of the parts when the shutter lever is in elevated position.

Referring more particularly to the drawings wherein like reference numerals indicate corresponding parts throughout the several views 5 represents a small plate pivotally connected as at 6 to the front face of a camera (not shown). One end of a curved link 7 is pivoted to the plate 5 the other end thereof being pivoted to the upper end of a bar 8 slidably mounted in a guide member 9. The guide member which is slotted longitudinally as at 10 so as not to interfere with the movement of the shutter lever 11, which projects therethrough, is fastened to the camera face below the point of attachment of the plate 5, by any suitable securing means (not shown). The lower end of the bar 8 is formed with a small slot 12 of sufficient size to loosely receive the free end of the shutter lever or button 13.

Figure 2:
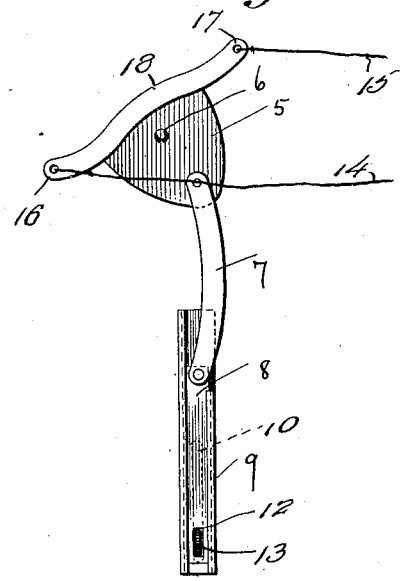
Fig. 2 is a similar view showing the position of the parts when the shutter lever has been moved to lowermost position.
Figure 3:
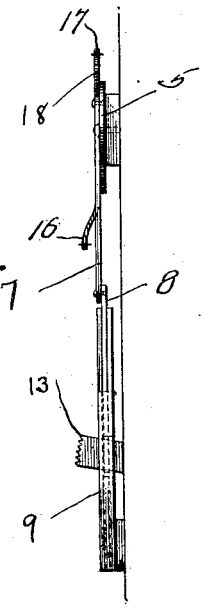
Fig. 3 is a side view of Fig. 1.

A pair of cords, threads or the like 14 and 15 are attached to the respective ends 16 and 17 of an arm 18 attached to or formed integrally with the plate 5. When the parts are in the position illustrated in Figs. 1 and 3 and it is desired to take a picture in the usual manner the operator presses the shutter lever 13 downwardly with his thumb. If however, the operator wishes to take his own picture or should it be necessary for any other reason for him to be some distance from the camera he would operate the shutter lever by pulling upon the cord 15, thus causing the bar 8 to descend in the guide 9 to Fig. 2 position. To take a second picture a pull is exerted on the cord 14 causing the parts to return to the positions illustrated in Fig. 1. It will of course be understood that movement of the plate 5 is communicated to the shutter lever or button through link 7 and bar 8 in an obvious manner.

Having thus described my invention, what I claim is:

In an attachment for cameras a plate adapted to be pivoted to the side of the camera, a guide member slotted to permit movement therein of the shutter lever, a link pivotally connected to the plate, a bar connected to said link slidably mounted in said guide, said bar being slotted to receive the end of the shutter lever and means for actuating said plate on its pivot.

In testimony whereof I affix my signature in presence of two witnesses.

HARRY FREDERICK PREFONTAINE.

Witnesses:
MARK SHAPIRE,
CARL E. MILLER.

Copies of this patent may be obtained for five cents each, by addressing the "Commissioner of Patents, Washington, D. C."